US007085859B2

(12) United States Patent
Chen et al.

(10) Patent No.: US 7,085,859 B2
(45) Date of Patent: Aug. 1, 2006

(54) METHOD, APPARATUS AND PROGRAM STORAGE DEVICE FOR AUTOMATICALLY PRESENTING STATUS FROM A HOST BUS ADAPTER UNTIL AN ERROR IS DETECTED

(75) Inventors: James Chien-Chiung Chen, Tucson, AZ (US); Carol Spanel, San Jose, CA (US); Andrew Dale Walls, San Jose, CA (US); Lih-Chung Kuo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 10/437,554

(22) Filed: May 14, 2003

(65) Prior Publication Data

US 2004/0230727 A1 Nov. 18, 2004

(51) Int. Cl.
*G06F 3/00* (2006.01)
*G06F 13/00* (2006.01)
*G06F 13/14* (2006.01)

(52) U.S. Cl. .......................... 710/18; 710/19; 710/100
(58) Field of Classification Search ..................... None
See application file for complete search history.

(56) References Cited

U.S. PATENT DOCUMENTS

| 4,549,296 | A |   | 10/1985 | Castel et al. |
| 4,858,234 | A | * | 8/1989 | Hartwell et al. ............... 714/24 |
| 5,297,067 | A |   | 3/1994 | Blackborow et al. |
| 5,319,754 | A | * | 6/1994 | Meinecke et al. ............ 710/52 |
| 5,598,580 | A |   | 1/1997 | Detschel et al. |
| 5,838,950 | A |   | 11/1998 | Young |
| 5,918,028 | A | * | 6/1999 | Silverthorn et al. ......... 710/306 |
| 5,978,863 | A | * | 11/1999 | Gates et al. ................... 710/18 |
| 6,016,506 | A |   | 1/2000 | Amuro et al. |
| 6,381,721 | B1 | * | 4/2002 | Warren ....................... 714/727 |
| 6,477,601 | B1 |   | 11/2002 | Young |
| 6,502,156 | B1 |   | 12/2002 | Sacker et al. |
| 6,526,535 | B1 | * | 2/2003 | Warren ....................... 714/727 |
| 6,810,440 | B1 | * | 10/2004 | Micalizzi et al. ............. 710/19 |
| 2002/0108003 | A1 |   | 8/2002 | Ellis et al. |
| 2003/0014580 | A1 |   | 1/2003 | Young |
| 2004/0158668 | A1 | * | 8/2004 | Golasky et al. ............. 710/315 |

FOREIGN PATENT DOCUMENTS

EP 0 486 230 A1 5/1992
GB 2 308 904 A 7/1997

(Continued)

OTHER PUBLICATIONS

"Streamlined Status Reporting Scheme for Adapter Cards," Nov. 1, 1990, IBM Technical Disclosure Bulletin, vol. 33, Issue 6A, p. 279-280.*
"High Performance Interface Protocol," Aug. 1, 1990, IBM Technical Disclosure Bulletin, vol. 33, Issue 3B, p. 376-378.*

*Primary Examiner*—Rahana Perveen
*Assistant Examiner*—Brian Misiura
(74) *Attorney, Agent, or Firm*—Chambliss, Bahner & Stophel P.C.; David W. Lynch

(57) ABSTRACT

A method, apparatus and program storage device for automatically presenting status from a host bus adapter until an error is detected is provided. Data is transmitted between the host bus adapter and a host. The host performs data transmission validation and determines whether data transmission was successful. The host bus adapter automatically sends status information when data transmission was successful, else the host bus adapter waits for status type identification from the host for transmission of data.

37 Claims, 5 Drawing Sheets

FOREIGN PATENT DOCUMENTS

| | | |
|---|---|---|
| JP | 61264435 | 11/1986 |
| JP | 7248996 | 9/1995 |
| JP | 07248996 A * | 9/1995 |
| JP | 9034831 | 2/1997 |

* cited by examiner

METHOD, APPARATUS AND PROGRAM STORAGE DEVICE FOR AUTOMATICALLY PRESENTING STATUS FROM A HOST BUS ADAPTER UNTIL AN ERROR IS DETECTED

BACKGROUND OF THE INVENTION

1. Field of the Invention

This invention relates in general to an input/output system, and more particularly to a method, apparatus and program storage device for automatically presenting status from a host bus adapter until an error is detected.

2. Description of Related Art

In a data processing system, communication adapters and Input/Output (I/O) controllers are provided to transfer data between a host system and a network or peripheral device. The memory and processor of the host system are coupled to the adapter or controller by a system or I/O bus or by a network.

As the central processing units in host systems have become faster, the difference between the speed of processor operations involving local registers or cache memory, and the speed of accesses between the processor of the host system and main memory or peripheral devices, has been magnified. As a result, in order for data processing systems to better utilize the faster processors, there is a need to provide more efficient methods of transferring data between the host system and networks or peripheral devices.

Data is typically transmitted back and forth between a host computer system and peripheral devices, such as disk drives, tape drives, or printers, over a data communication bus. The data communication bus couples the host and the peripheral devices together and enables the exchange of data between the system and the peripheral devices. One type of data communication bus is a Small Computer System Interconnect (SCSI) data bus. A SCSI data bus can be configured in different ways and has several modes of operation.

The SCSI protocol specifies communication between an initiator, or device that issues SCSI commands, and a target, a device that executes SCSI commands. The SCSI data bus is connected to the initiator via a host adapter and is connected to target devices via device controllers. Each device controller is matched to the specific type of device connected to the SCSI bus.

When information is transferred back and forth between the initiator and any one of the plurality of target devices, a handshaking protocol is used to control the transfer of data on the data bus connected therebetween.

There are many Upper Level Protocols (ULP) which maps SCSI to some physical interface. FCP is a protocol which maps SCSI to Fibre Channel. iSCSI maps SCSI to Ethernet. FCP, iSCSI, and other protocols talk in terms of an initiator and a target. An initiator is an agent that initiates an exchange and issues a SCSI command to a target.

A SCSI I/O launched by the operating system may initiate, for example, an FCP exchange between the host and target using command frames known as information units (IUs). However, as suggested above, FCP is just one example. Within the exchange session, groups of frames comprising one or more sequences would be used to transport data between an initiator and a target. The target would reply that it is ready. The initiator responds by issuing a data descriptor information unit. The initiator then sends one or more solicited data information units. The target responds by issuing a command status information unit indicating completion of the send request.

The initiation of the FCP exchange with the target replying, the initiator response with data descriptor information and the target issuing command status may be combined in different ways to make a protocol more efficient. The target must then accept the data and issue a response of some kind. If no errors or exceptions are received then the response would indicate normal status.

A typical target is some kind of storage system. For example, a target may be a Host Bus Adapter (HBA), which handles the protocol communicating with a host like a PC or a specialized piece of hardware. The HBA will notify the host of SCSI commands and will be told from the host where to get or put the data.

For a write command, the HBA must notify the host that the initiator wants to perform a write operation. If the host is a complex storage system, it will need to determine if the sectors being written are already in the write cache and precisely where the data is to be written. The host may need to do some additional formatting on the data as well. The host will communicate with the HBA where to put the data and the HBA then will store the data.

In today's environment, the host will need to communicate to the HBA that the operation was successful and assuming that the HBA did not detect an error then deliver good status back in the response. Read commands require similar processing and handshake signaling.

This additional interaction between the host and the HBA is a significant amount of processing and handshaking for both the host and the HBA. However, the overhead associated with the additional processing and handshake signaling reduces system performance.

It can be seen that there is a need for a method, apparatus and program storage device for automatically presenting status from a host bus adapter until an error is detected.

SUMMARY OF THE INVENTION

To overcome the limitations in the prior art described above, and to overcome other limitations that will become apparent upon reading and understanding the present specification, the present invention discloses a method, apparatus and program storage device for automatically presenting status from a host bus adapter until an error is detected.

The present invention solves the above-described problems by allowing an HBA to automatically respond back to the initiator without waiting for the host to tell the HBA to do so. This is done by having specialized hardware which checks the data and control logic and determines very quickly if an error has occurred during transmission of the data from the HBA to the host. If an error is detected, then a signal is raised to the HBA handling that particular port. The HBA immediately stops automatically sending status back to the initiator and now requires the host to communicate separately for each operation telling the host bus adapter what status to present to the initiator.

A program storage device in accordance with the principles of the present invention includes a method for transmitting data via a host bus adapter, performing data transmission validation at a host, determining at the host whether data transmission was successful and automatically sending status information from the host bus adapter when data transmission was successful, else causing the host bus adapter to wait for status type identification from the host for transmission of data.

In another embodiment of the present invention, another program storage device is provided. This program storage device includes a method for transmitting data between a host and a host bus adapter, performing data transmission validation at the host, determining at the host whether data transmission was successful and causing the host bus adapter to wait for status type identification from the host for transmission of data when data transmission is determined to be unsuccessful.

In another embodiment of the present invention, another program storage device is provided. This program storage device includes a method for transmitting data between a host bus adapter and a host and automatically sending status information from the host bus adapter until receiving at the host bus adapter a signal from the host for inhibiting automatic status transmission by the host bus adapter.

In another embodiment of the present invention, an input/output system is provided. The input/output system includes a host bus adapter for transmitting data and a host, coupled to the host bus adapter, for performing data transmission validation and determining whether data transmission was successful, wherein the host bus adapter automatically sends status information until the host determines data transmission was not successful and sends the host bus adapter a signal to inhibit automatic status transmission by the host bus adapter.

In another embodiment of the present invention, a host is provided. The host includes a host bus adapter interface for processing transmitted data, a processor, coupled to the host bus adapter interface, for performing data transmission validation and a port, coupled to the processor, for transmitting to a host bus adapter a signal for causing the host bus adapter to wait for status type identification for transmission of data when data transmission is determined to be unsuccessful.

In another embodiment of the present invention, a host bus adapter is provided. The host bus adapter includes a protocol handling interface for processing transmitted data and a processor, coupled to the protocol handling interface, for automatically sending status information until receiving a signal for inhibiting automatic status transmission.

In another embodiment of the present invention, a method is provided for automatically presenting status from a host bus adapter until an error is detected. The method includes transmitting data between a host bus adapter and a host, performing data transmission validation at the host, determining at the host whether data transmission was successful and automatically sending status information from the host bus adapter when data transmission was successful, else causing the host bus adapter to wait for status type identification from the host for transmission of data.

In another embodiment of the present invention, an input/output system is provided. The input/output system includes means for transmitting data and means, coupled to the means for transmitting, for performing data transmission validation and determining whether data transmission was successful, wherein the means for transmitting data sends status information when the means for performing data transmission validation determines data transmission was successful, else the means for transmitting data waits for status type identification from the host for transmission of data.

In another embodiment of the present invention, a host is provided. The host includes means for processing transmitted data, means, coupled to the means for processing, for performing data transmission validation and means, coupled to the means for performing, for transmitting a signal for causing a host bus adapter means to wait for status type identification for transmission of data when data transmission is determined to be unsuccessful.

In another embodiment of the present invention, a host bus adapter is provided. The host bus adapter includes means for transmitting data and means, coupled to the means for transmitting, for automatically sending status information until receiving a signal for inhibiting automatic status transmission.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiments, reference is made to the accompanying drawings which form a part hereof, and in which is shown by way of illustration of the preferred embodiments of the present invention. It is to be understood that other embodiments may be utilized because structural changes may be made without departing from the scope of the present invention.

The present invention provides a method, apparatus and program storage device for automatically presenting status from a host bus adapter until an error is detected. This invention allows a host bus adapter (HBA) to automatically respond back to the initiator without waiting for the host to tell the HBA to do so. The host checks the data and control logic and determines very quickly if an error has occurred during transmission of the data from the HBA to the host. If an error is detected, then a signal is raised to the HBA handling that particular port. The HBA immediately stops automatically sending status back to the initiator and now requires the host to communicate separately for each operation telling the HBA what status to present to the initiator.

Figure 1:
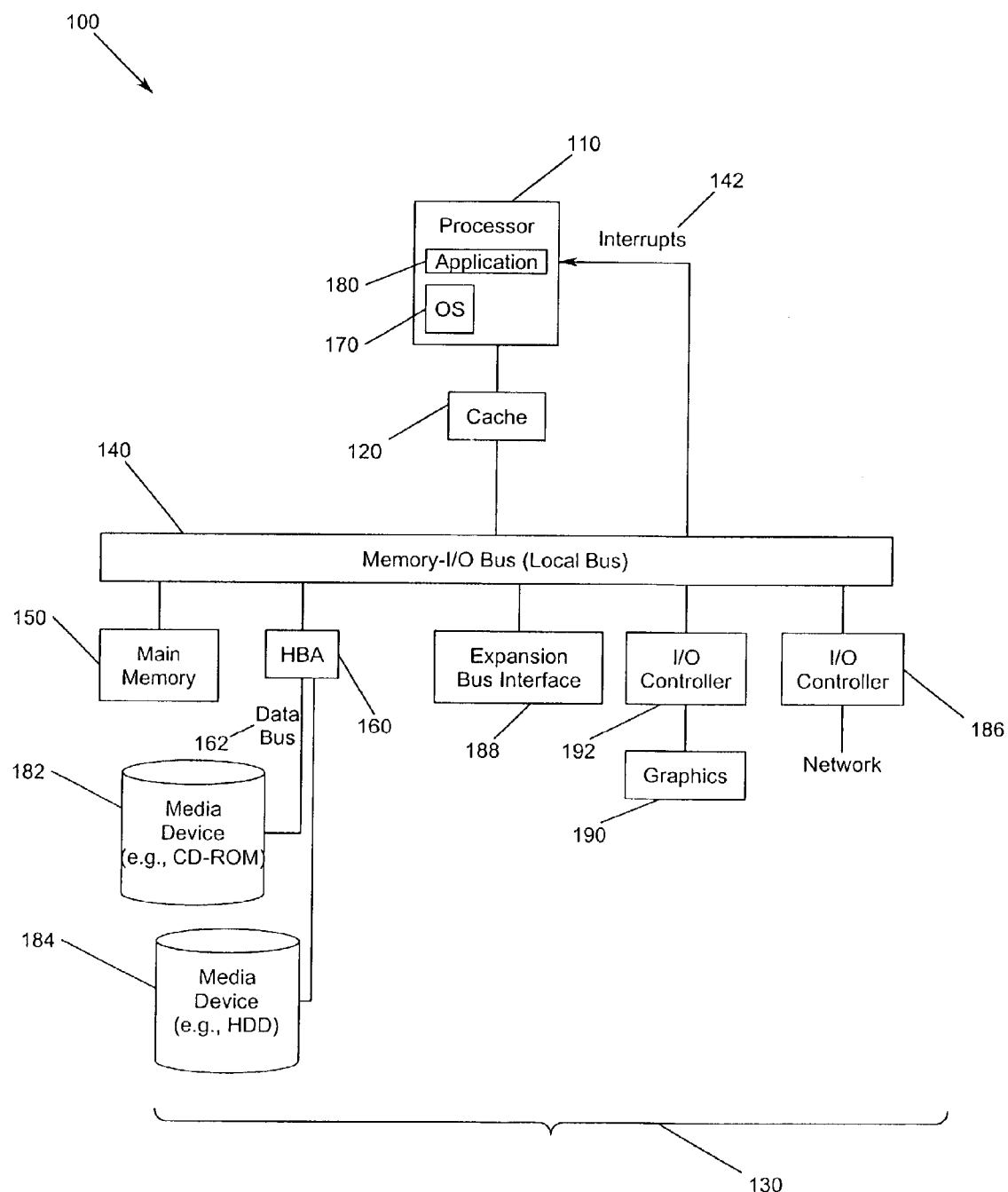
FIG. 1 illustrates an Input/Output (I/O) system according to the present invention.

FIG. 1 illustrates an Input/Output (I/O) system 100 according to the present invention. In FIG. 1 a processor 110 is coupled to cache memory 120. Cache memory 120 is high-speed memory that is provided for improving processor performance. Cache 120 resides between the processor 110 and the main system memory 150. I/O devices 130 are used to provide various services, such as storage, graphics processing, network connections, printing, etc. A system bus 140, which is usually referred to as the local bus, provides a connection between the I/O devices 130, processor 110 and memory 150. In particular, the local bus 140 connects the processor 110 to main memory 150 and cache 120. The I/O devices 130 are coupled to the local bus 140 through a host bus adapter (HBA) 160 and an I/O bus 162. The I/O bus 162 connects the various peripheral devices 130 via the HBA 160 to the processor 110.

An operating system 170 runs on the processor 110 and is used to coordinate and provide control of various components within I/O system 100 in FIG. 1. The operating system 170 may be a commercially available operating system, such as OS/2, which is available from International Business Machines Corporation. "OS/2" is a trademark of International Business Machines Corporation. Instructions for the operating system 170 and applications or programs 180 may be located on media devices 182, 184, and may be loaded into main memory 150 for execution by processor.

Communication among the devices 130 and the processor 110 use both bus protocols and interrupts 142. A bus protocol is used to define the semantics of the bus transaction and to arbitrate bus usage. A bus transaction includes at least sending an address and receiving or sending data. For example, a read transaction transfers data from memory 150 to the processor 110 or to an I/O device 130, and a write transaction transfers data from the processor 110 or an I/O device 130 to memory 150.

A host bus adapter (HBA) 160 is used to connect input/output peripherals, such as media devices 182, 184, to the processor 110. I/O devices 130 may include, for example, a SCSI, Fibre Channel, Ethernet, or Infiniband™ Trade Association (www.infinibandta.com) compliant I/O device. HBA 160 may be utilized, for example, for implementing a small computer system interface (SCSI) high speed parallel interface defined by the X3T9.2 Committee of the American National Standards Institute (ANSI). An interface may connect processor 110 to media devices 182, 184, such as hard disk drives, printers, and other devices. A plurality of media devices 182, 184 may be coupled by an I/O bus 162. An I/O bus 162 is a parallel bus that carries data and control signals from the host bus adapter 160 to the media devices 182, 184. For example, a media device 182, 184 may be a SCSI device, which is a peripheral device that uses the SCSI standard to exchange data and control signals with a processor 110.

One system of peripheral devices for storing data is called a redundant array of independent disks (RAID). RAID is a data storage method in which data, along with information used for error correction, such as parity bits or Hamming codes, is distributed among two or more hard disk drives 184 in order to improve performance and/or data integrity. A hard disk array 184 may be governed by array management software and a host bus adapter 160 which handles the error correction.

Those of ordinary skill in the art will appreciate that the hardware in FIG. 1 may vary depending on the implementation. Additional connections to local bus 140 may be made through direct component interconnection or through add-in boards. A network adapter 186, host bus adapter 160, and expansion bus interface 188 may be connected to local bus 140 by direct component connection. In contrast, a graphics adapter 190, for example, may be connected to local bus 140 by add-in boards inserted into expansion slots. In the depicted example, host bus adapter 160 provides a connection for media devices 182, 184, such as hard disk drives, tape drives, CD-ROM drives, and digital video disc read only memory drive (DVD-ROM). Typical local bus 140 implementations will support, for example, three or four PCI expansion slots or add-in connectors 192. Nevertheless, those skilled in the art will recognize that the depicted example is not meant to imply architectural limitations with respect to the present invention. For example, the processes of the present invention may be applied to multiprocessor data processing systems.

Figure 2:
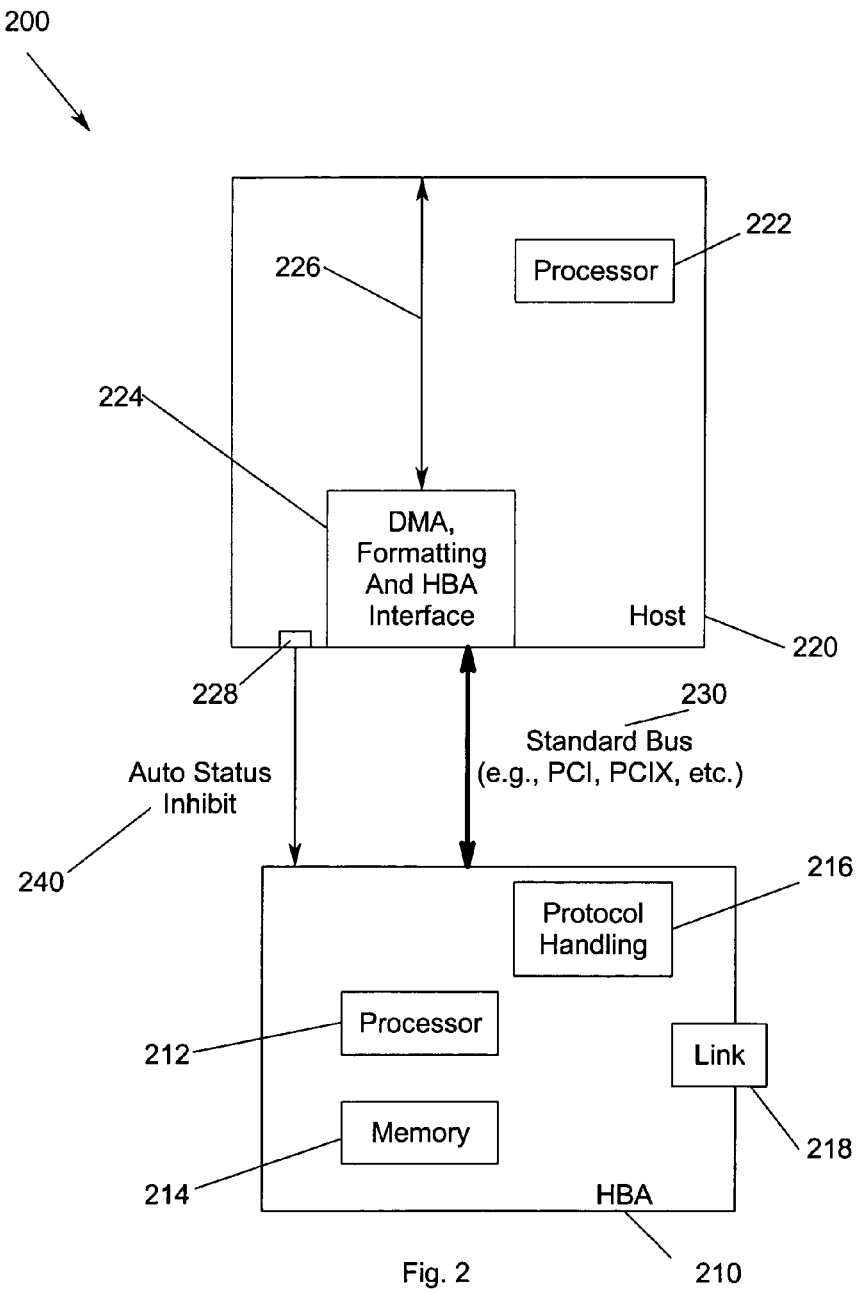
FIG. 2 illustrates a system for automatically presenting status from a host bus adapter until an error is detected according to the present invention.

FIG. 2 illustrates a system 200 for automatically presenting status from a host bus adapter until an error is detected according to the present invention. FIG. 2 shows a HBA 210 that is coupled to a host 220 via a standard bus 230, such as PCI, PCIX, etc. The HBA 210 includes a processor 212, memory 214 and a protocol handling interface 216 for handling data transmission between the host 220 and the HBA 210. A link 218, such as for optics, is provided. The host 220 includes a processor 222 and an HBA interface 224 for providing direct memory access and formatting. The HBA interface 224 also provides access 226 to other portions of the host 220. The host 220 further includes a port 228 for communicating an auto status inhibit signal 240 to the HBA 210.

Each host 220 is coupled to an interface card, such as a host bus adapter 210. As mentioned, the host bus adapter 210 has a processor 212 and memory 214, such as RAM or EEPROM. In one embodiment, at least a portion of the memory 214 is used to hold adapter code downloaded from the host 220. In one embodiment, each host bus adapter 210 is located on a separate circuit card. In another embodiment, more than one host bus adapter 210 is located on a circuit card. Each host bus adapter 210 is typically connected to a local bus 230, such as a PCI bus.

In FIG. 2 the HBA 210 interprets a protocol directly and provides an application interface in order to store and retrieve data to send over the link 218. A host 220 of some kind will communicate with this HBA 210. This host 220 may be a PC or server, or a set of electronics with a microprocessor, memory and logic which can interface to one or more HBAs 210 and can also interface to internal fabric within the host 220. For example, a PCI card could be designed to provide the HBA 210 with a microprocessor 212 and other application specific integrated circuits which could further format the HBA data and communicate with the PCI bus 230. Such PCI card would then plug into a server with other components (including like cards) and could act as a storage, tape or print server.

In such environments, performance is very important and eliminating any overhead will increase the total number of operations per second that the PCI card can perform. Both the host 220 and the HBA 210 typically contain microprocessors 222, 212 which are assisting in handling the interface protocol as well as the protocol between the two components. For performance to be high, it is important to find ways to parallel activities and to minimize transactions across the standard bus 230 as shown.

According to the present invention, the HBA 210 may automatically send status via the link 218 after processing a command, such as a SCSI command. Otherwise the host must process the fact that the information transfer has occurred error free and must then send a command to the HBA 210 informing the HBA 210 that it should give normal ending status to the initiator, e.g., the host 220.

Figure 3:
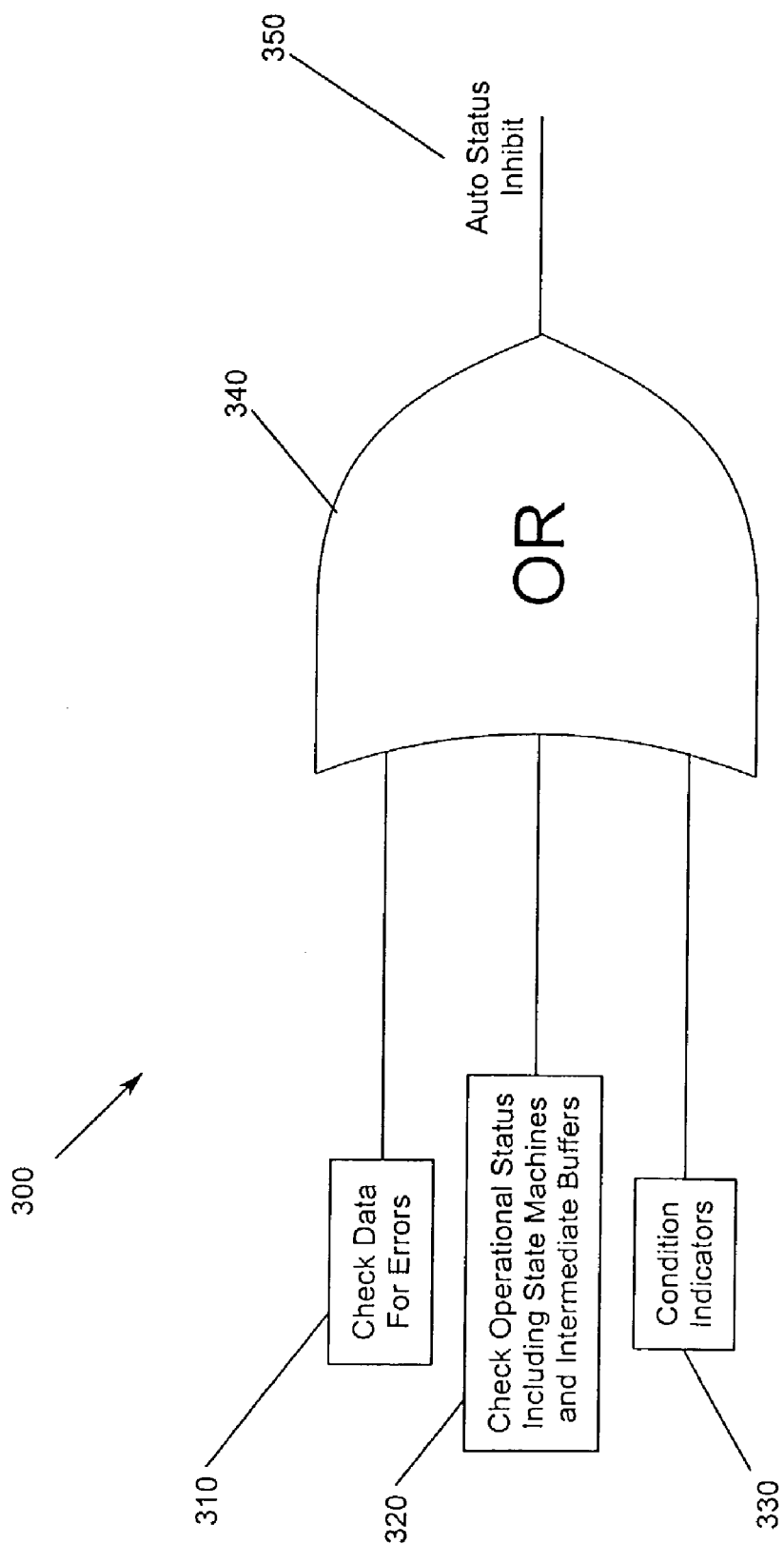
FIG. 3 illustrates the system error/condition verification system according to the present invention.

FIG. 3 illustrates the system error/condition verification system 300 according to the present invention. The present invention eliminates the handshake and processing that both processors must otherwise perform. The system requires that all good error checking capability exists on the host. Therefore, as the data is transferred, the data is thoroughly checked 310. The host is also checking to ensure that errors in state machines and intermediate buffers that are traversed on the way to the data memory do not occur 320. All of these checks are processed by an OR gate 340 along with exception conditions from the processor and catastrophic error conditions like clock checks, bus hangs, etc 330. Any of these checks 310–330 being asserted will therefore cause the host to assert a signal 350 to the HBA thereby inhibiting the HBA from sending automatic status. Then, as explained above, the host is then responsible for performing error recovery, for processing each command and determining the status to send for that command. Some commands might be unaffected by the error detected and some may need to have bad status returned and retries initiated.

Figure 4:
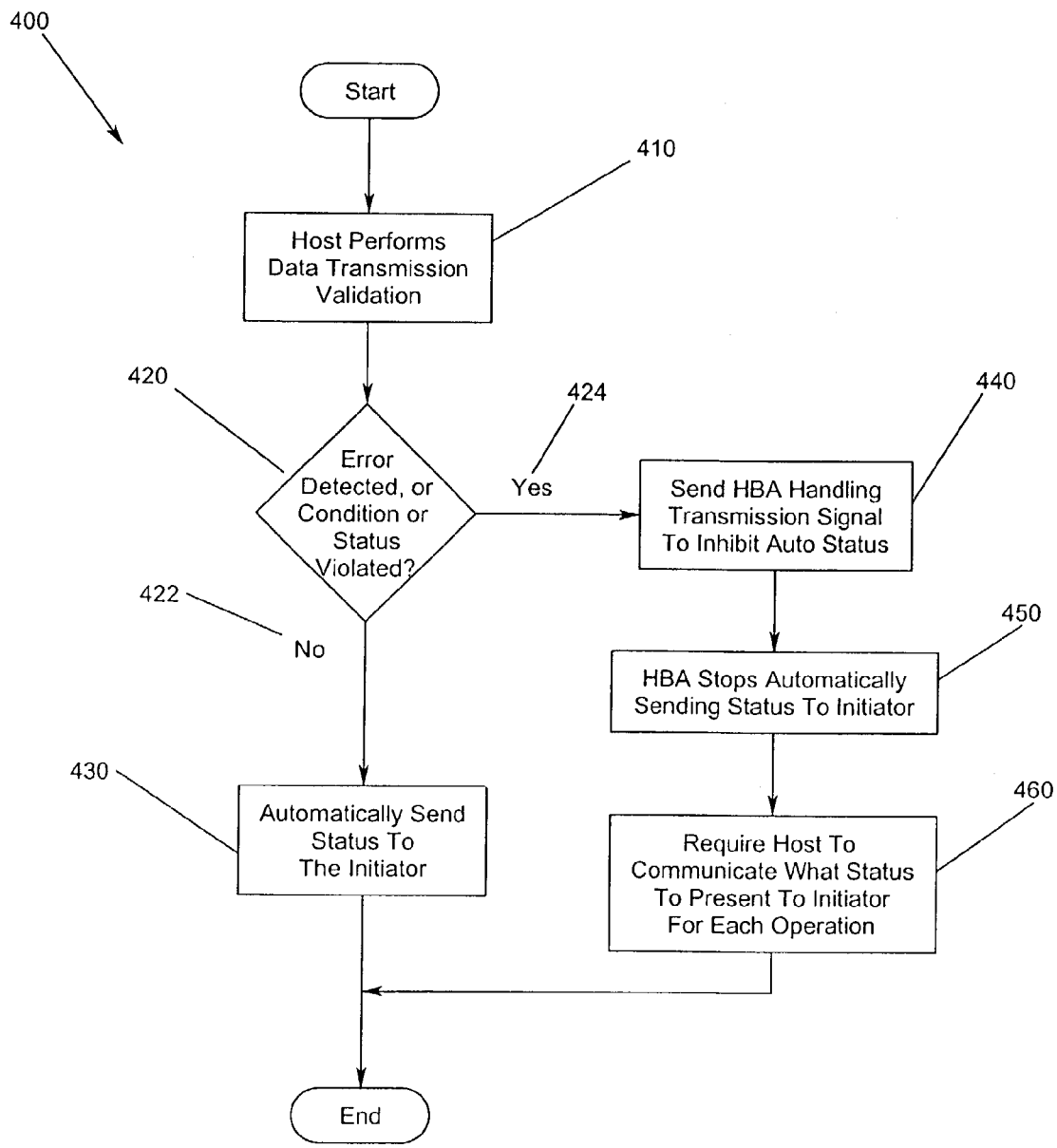
FIG. 4 illustrates a flow chart of a method for automatically presenting status from a host bus adapter until an error is detected according to the present invention.

FIG. 4 illustrates a flow chart of a method 400 for automatically presenting status from a host bus adapter until an error is detected according to the present invention. First, after processing a command, the host performs data transmission validation 410. Such validation includes checking data for errors, and then checking operational status and condition indicators for an error condition. A determination is made whether an error is detected, or whether a condition or status is violated 420. If not 422, the HBA is configured to automatically send status to the initiator 430. If yes 424, the HBA that is handling the transmission is sent a signal to inhibit auto status 440. The HBA stops automatically sending status to initiator 450. The host is then required to communicate what status to present to the initiator for each operation 460.

Figure 5:
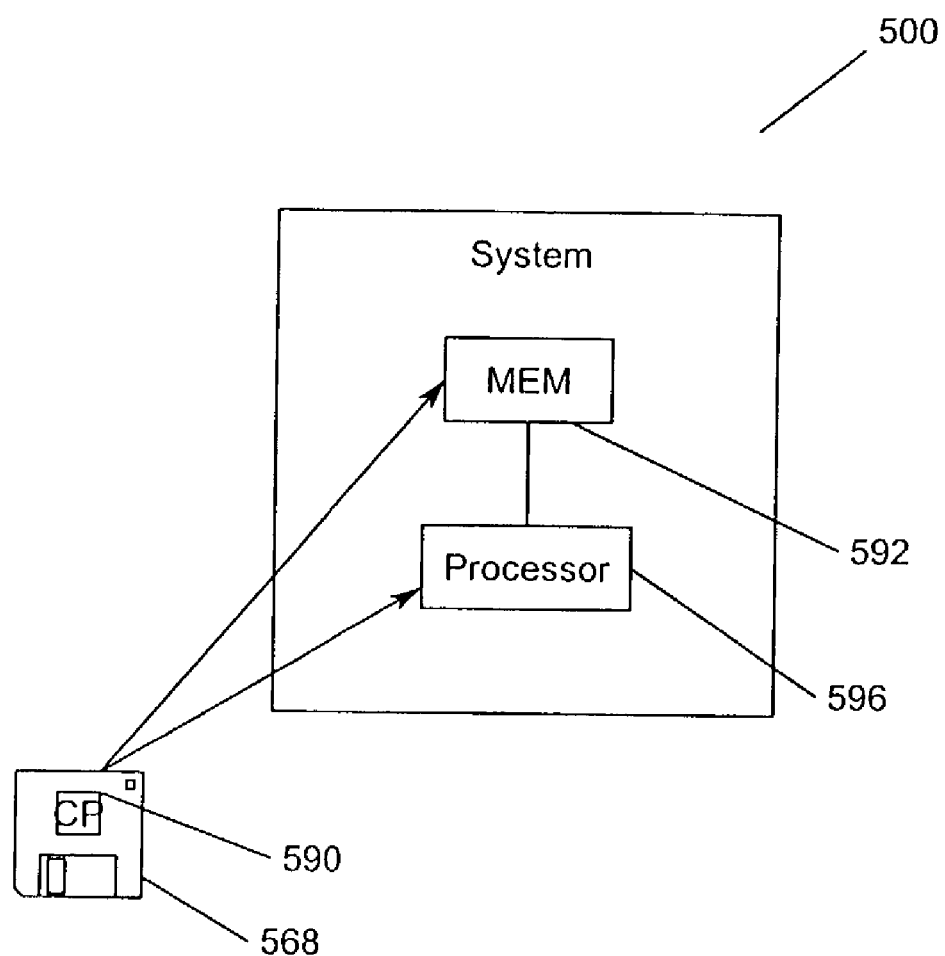
FIG. 5 illustrates a system according to the present invention, wherein the process illustrated with reference to FIGS. 1–4 may be tangibly embodied in a program storage device.

FIG. 5 illustrates a system 500 according to the present invention, wherein the process illustrated with reference to FIGS. 1–4 may be tangibly embodied in a computer-readable medium or carrier, e.g. one or more of the fixed and/or removable data storage devices 568 illustrated in FIG. 5, or other data storage or data communications devices. A computer program 590 expressing the processes embodied on the removable data storage devices 568 may be loaded into the memory 592 or into system 500, e.g., in a processor 596, to configure the system 500 of FIG. 5, for execution. The computer program 590 comprise instructions which, when read and executed by the system 500 of FIG. 5, causes the system 500 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A program storage device readable by a computer, the medium tangibly embodying one or more programs of instructions executable by the computer to perform a method for automatically presenting status from a host bus adapter until an error is detected, the method comprising:

transmitting data via a host bus adapter;

performing data transmission validation at a host;

determining at the host whether data transmission was successful; and automatically sending status information from the host bus adapter when data transmission was successful, else causing the host bus adapter to wait for status type identification from the host for transmission of data.

2. The program storage device of claim 1, wherein the performing data transmission validation at the host further comprises determining whether data was transmitted without errors.

3. The program storage device of claim 1, wherein the performing data transmission validation at the host further comprises checking operational status and condition indicators.

4. The program storage device of claim 3, wherein the checking condition indicators further comprises checking processor exception conditions and catastrophic error conditions.

5. The program storage device of claim 3, wherein the checking operational status further comprises checking state machines and intermediate buffers traversed during data transmission for errors.

6. The program storage device of claim 1, wherein the causing the host bus adapter to wait for status type identification from the host for transmission of data further comprises:

sending from the host to the host bus adapter handling the data transmission a signal to inhibit automatic status transmission by the host bus adapter; and halting automatic status transmission by the host bus adapter handling the data transmission.

7. The program storage device of claim 6, wherein the causing the host bus adapter to wait for status type identification from the host for transmission of data further comprises sending status type identification from the host to the host bus adapter handling the data transmission to communicate a type of status the host bus adapter is to present for a data transmission.

8. The program storage device of claim 1, wherein the determining at the host whether data transmission was successful further comprises logically ORing a signal indicating whether data was transmitted error free, at least one operation status indicator and at least one condition indicator to generate the signal for inhibiting automatic status transmission by the host bus adapter.

9. A program storage device readable by a computer, the medium tangibly embodying one or more programs of instructions executable by the computer to perform a method for controlling status messaging from a host bus adapter, the method comprising:

transmitting data between a host and a host bus adapter;

performing data transmission validation at the host;

determining at the host whether data transmission was successful; and causing the host bus adapter to wait for status type identification from the host for transmission of data when data transmission is determined to be unsuccessful.

10. The program storage device of claim 9, wherein the performing data transmission validation at the host further comprises determining whether data was transmitted without errors.

11. The program storage device of claim 9, wherein the performing data transmission validation at the host further comprises checking operational status and condition indicators.

12. The program storage device of claim 11, wherein the checking condition indicators further comprises checking processor exception conditions and catastrophic error conditions.

13. The program storage device of claim 11, wherein the checking operational status further comprises checking state machines and intermediate buffers traversed during data transmission for errors.

14. The program storage device of claim 9, wherein the determining at the host whether data transmission was successful further comprises logically ORing a signal indicating whether data was transmitted error free, at least one operation status indicator and at least one condition indicator to generate the signal for inhibiting automatic status transmission by the host bus adapter.

15. A program storage device readable by a computer, the medium tangibly embodying one or more programs of instructions executable by the computer to perform a method for automatically presenting status from a host bus adapter until an error is detected, the method comprising:
    transmitting data between a host bus adapter and a host;
    automatically sending status information from the host bus adapter until receiving at the host bus adapter a signal from the host for inhibiting automatic status transmission by the host bus adapter; and
    when the signal for inhibiting automatic status transmission is received, receiving status type identification from the host to communicate a type of status the host bus adapter is to present to the host for data transmission.

16. The program storage device of claim 15, wherein the receiving the signal for inhibiting automatic status transmission occurs when data was transmitted with errors.

17. The program storage device of claim 15, wherein the receiving the signal for inhibiting automatic status transmission occurs when operational status or condition indicators indicate to the host an error condition.

18. An input/output system, comprising:
    a host bus adapter for transmitting data; and
    a host, coupled to the host bus adapter, for performing data transmission validation and determining whether data transmission was successful;
    wherein the host bus adapter automatically sends status information until the host determines data transmission was not successful and sends the host bus adapter a signal to inhibit automatic status transmission by the host bus adapter and wherein the host bus adapter waits for status type identification from the host for transmission of data when the host sends the signal to inhibit automatic status transmission by the host bus adapter, wherein the host bus adapter halts automatic status transmission in response to the signal.

19. The input/output system of claim 18, wherein the host performs data transmission validation by determining whether data was transmitted without errors.

20. The input/output system of claim 18, wherein the host performs data transmission validation by checking operational status and condition indicators.

21. The input/output system of claim 20, wherein the host checks condition indicators by checking processor exception conditions and catastrophic error conditions.

22. The input/output system of claim 20, wherein the host checks operational status by checking state machines and intermediate buffers traversed during data transmission for errors.

23. The input/output system of claim 18, wherein the host provides status type identification for transmission of data after sending the signal for inhibiting automatic status transmission.

24. The input/output system of claim 18, wherein the host further comprises a logic ORing gate for logically ORing a signal indicating whether data was transmitted error free, at least one operation status indicator and at least one condition indicator to generate the signal for inhibiting automatic status transmission by the host bus adapter.

25. A host for controlling status messaging from a host bus adapter, comprising:
    a host bus adapter interface for processing transmitted data;
    a processor, coupled to the host bus adapter interface, for performing data transmission validation; and
    a port, coupled to the processor, for transmitting a signal to a host bus adapter for causing the host bus adapter to wait for status type identification for transmission of data when data transmission is determined to be unsuccessful.

26. The host of claim 25, wherein the processor performs data transmission validation at the host by determining whether data was transmitted without errors.

27. The host of claim 25, wherein the processor performs data transmission validation at the host by checking operational status and condition indicators.

28. The host of claim 27, wherein the processor checks condition indicators by checking processor exception conditions and catastrophic error conditions.

29. The host of claim 27, wherein the processor checks operational status by checking state machines and intermediate buffers traversed during data transmission for errors.

30. The host of claim 25, further comprising a logical OR gate for logically ORing a signal indicating whether data was transmitted error free, at least one operation status indicator and at least one condition indicator to generate the signal for inhibiting automatic status transmission by the host bus adapter.

31. A host bus adapter, comprising:
    a protocol handling interface for processing transmitted data; and
    a processor, coupled to the protocol handling interface, for automatically sending status information until receiving a signal for inhibiting automatic status transmission;
    wherein the processor receives status type identification to communicate a type of status to present for a data transmission.

32. The host bus adapter of claim 31, wherein the signal for inhibiting automatic status transmission indicates when data was transmitted with errors.

33. The host bus adapter of claim 31, wherein the signal for inhibiting automatic status transmission indicates that the operational status or condition indicators represent an error condition.

34. A method for automatically presenting status from a host bus adapter until an error is detected, comprising:
    transmitting data between a host bus adapter and a host;
    performing data transmission validation at the host;
    determining at the host whether data transmission was successful; and
    automatically sending status information from the host bus adapter when data transmission was successful, else causing the host bus adapter to wait for status type identification from the host for transmission of data.

35. An input/output system, comprising:
    means for transmitting data; and
    means, coupled to the means for transmitting, for performing data transmission validation and determining whether data transmission was successful;
    wherein the means for transmitting data sends status information when the means for performing data transmission validation determines data transmission was successful, else the means for transmitting data waits for status type identification from the host for transmission of data.

36. A host for controlling status messaging from a host bus adapter, comprising:
means for processing transmitted data;
means, coupled to the means for processing, for performing data transmission validation; and
means, coupled to the means for performing, for transmitting a signal to a host bus adapter means for causing the host bus adapter means to wait for status type identification for transmission of data when data transmission is determined to be unsuccessful.

37. A host bus adapter, comprising:
means for transmitting data;
means, coupled to the means for transmitting, for automatically sending status information until receiving a signal for inhibiting automatic status transmission; and
means coupled to the means for transmitting, for receiving status type identification to communicate a type of status to present for a data transmission.

* * * * *